(12) United States Patent
Huang

(10) Patent No.: US 7,196,988 B2
(45) Date of Patent: Mar. 27, 2007

(54) METHOD OF CONTROLLING ROTATING SPEED OF AN OPTICAL DRIVE

(75) Inventor: Chih Wei Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 540 days.

(21) Appl. No.: 10/853,207

(22) Filed: May 26, 2004

(65) Prior Publication Data
US 2004/0260871 A1    Dec. 23, 2004

(30) Foreign Application Priority Data
Jun. 18, 2003    (TW) .............................. 92116582 A

(51) Int. Cl.
*G11B 7/00*    (2006.01)

(52) U.S. Cl. ................. 369/47.38; 369/47.42

(58) Field of Classification Search ............. 369/47.11, 369/47.28, 47.3, 47.38, 47.42, 47.48
See application file for complete search history.

(56) References Cited

FOREIGN PATENT DOCUMENTS

JP    2000-149383    *  5/2000    .............. 369/53.38

* cited by examiner

*Primary Examiner*—Nabil Hindi
(74) *Attorney, Agent, or Firm*—Bacon & Thomas, PLLC

(57) ABSTRACT

The present invention discloses a method of controlling rotating speed of an optical drive. After a plurality of reading requests are issued by a host, the rotating speed of a spindle motor is increased if the time interval between any two reading requests is less than a first time period and the total duration time of issuing these reading requests is more than a second time period.

5 Claims, 2 Drawing Sheets

METHOD OF CONTROLLING ROTATING SPEED OF AN OPTICAL DRIVE

This application claims the benefit of Taiwan application Serial No. 092116582, filed Jun. 18, 2003, the subject matter of which is incorporated herein by reference.

BACKGROUND OF THE INVENTION

1. Field of the Invention

The invention relates in general to a method of controlling rotating speed of an optical drive, and more particularly to a method of controlling rotating speed of an optical drive according to the frequency and duration time of issuing a plurality of reading requests by a host.

2. Description of the Related Art

Along with the continual development of personal computers, the transmission speed and capacity of accompanied peripheral devices also become higher and higher. Therefore, the high-speed optical drive is still a mainstream product in terms of optical drives.

However, problems such as power consuming, vibrations and high energy consuming would arise if a high-speed optical drive is under high-speed operation, so the high-speed optical drive cannot continually maintain high-speed operation in practical operation. So an internal mechanism is needed for the high-speed optical drive to appropriately adjust the rotating speed of the optical drive.

Generally speaking, whether to increase the rotating speed of the spindle motor of an optical drive or not is determined according to the number of occurrences of erroneous data decoding. For example, the rotating speed of an optical drive may be further increased so the accessing of the data stored in the optical disk may be speeded up, if the number of occurrences of erroneous data decoding is less than a predetermined value when the spindle motor of the optical drive is rotating at a specific rotating speed within a fixed time period. To the contrary, the rotating speed of the optical drive will be lowered down, if the number of occurrences of erroneous data decoding is larger than the predetermined value when the spindle motor of the optical drive is rotating at a specific rotating speed within a fixed time period.

However, the above determination method cannot actually reflect the needs of an optical drive or a host. For example, when an optical drive is rotating at a low speed and a host is issuing reading requests in a low frequency, the data reading speed of the optical drive may be matched with the issuing speed of reading requests of the host. Suppose the optical drive has no error in data decoding, the rotating speed of the spindle motor of the optical drive must be increased according to the mechanism of determining the rotating speed in the prior art. However, it is inappropriate to increase the rotating speed of the spindle motor of the optical drive when the data reading speed of the optical drive is matched with the issuing speed of reading requests of the host. So the mechanism of determining the rotating speed in the prior art still needs to be improved.

SUMMARY OF THE INVENTION

It is therefore an object of the invention to provide a method of controlling rotating speed of an optical drive. When these addresses of the reading requests issued by a host issues are discontinuous, the optical drive determines the frequency of issuing the reading requests by the host and increases the rotating speed of the spindle motor at appropriate timing.

The method of controlling rotating speed of an optical drive provided in the invention is briefly disclosed below. The optical drive receives a plurality of reading requests issued by the host; the rotating speed of a spindle motor is increased, if the interval between any two reading requests is less than a first time period and the total issuing time of these reading requests is more than a second time period.

Other objects, features, and advantages of the invention will become apparent from the following detailed description of these preferred but non-limiting embodiments. The following description is made with reference to the accompanying drawings.

DETAILED DESCRIPTION OF THE INVENTION

Generally speaking, the data read from an optical disk are decoded and registered in a buffer inside the optical drive before being sent to a host for further processing. The buffer status message indicates the present status of the buffer. For example, when the buffer status message shows 'Busy', it is indicated that the optical drive is reading data from the optical disk and storing the accessed data in the buffer. This implies that the host is issuing requests in a high frequency, enabling the buffer to keep outputting data to the host. To the contrary, when the buffer status message shows 'Not Busy', it is indicated that the optical drive is not reading any data from the optical disk. This implies that the host is not issuing requests in a high frequency. So, the buffer status message may be sampled by a fixed sampling rate to determine the timing for increasing the rotating speed of the spindle motor of the optical drive.

Figure 1:
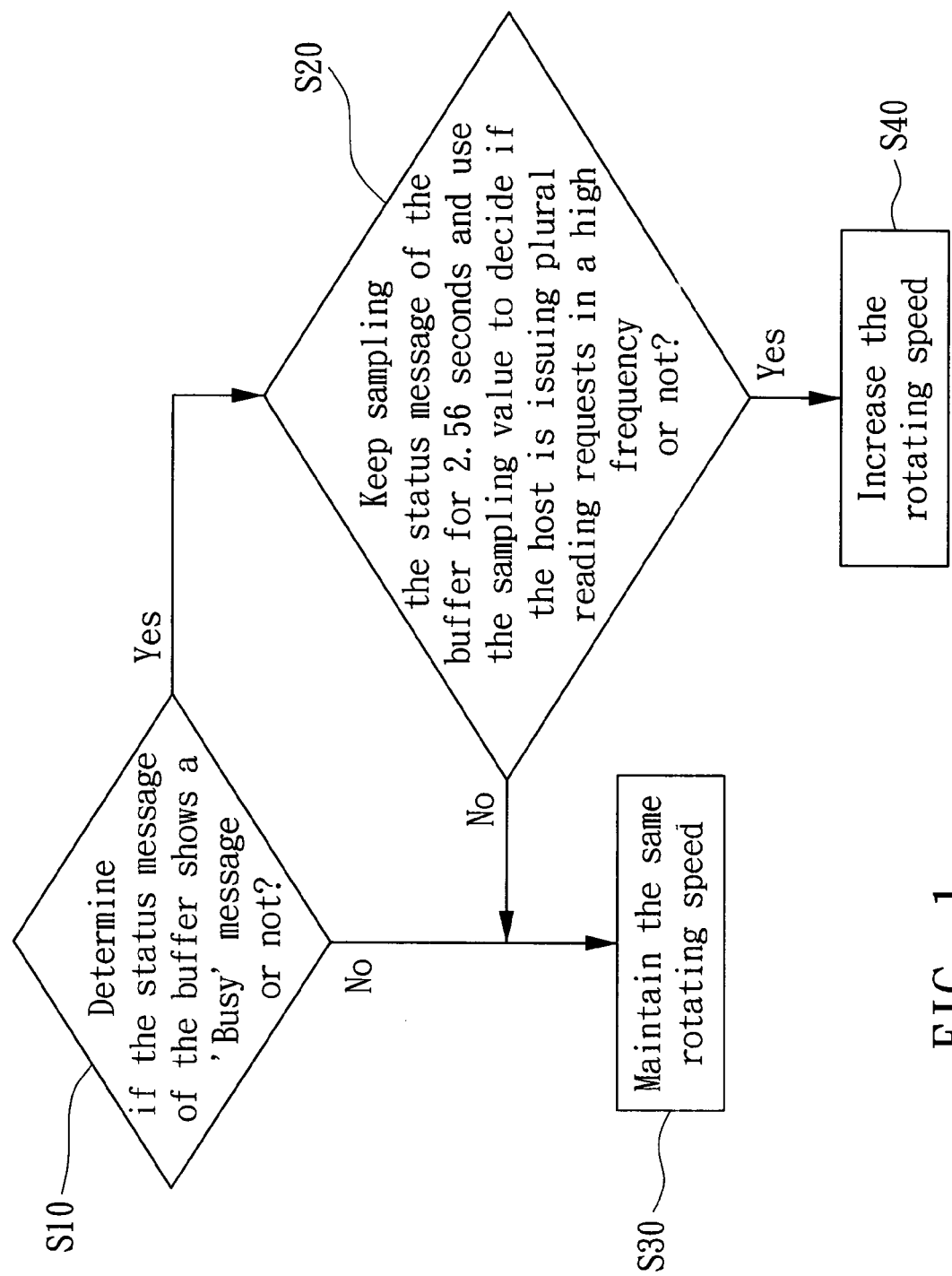
FIG. 1 is a flowchart of a method of controlling rotating speed of an optical drive when the addresses of these reading requests issued by a host are continuous.

Referring to FIG. 1, a flowchart of a method of controlling rotating speed of an optical drive is illustrated;

Step S10: Determine if the buffer status message shows a 'Busy' message or not;

Step S20: Keep sampling the buffer status message for 2.56 seconds and use the sampling value to decide if the host is issuing reading requests in a high frequency;

Step S30: Maintain the same rotating speed; and

Step S40: Increase the rotating speed.

According to the decision process illustrated in FIG. 1, whether to increase the rotating speed of an optical drive depends on the sampling of the buffer status message by using the fixed sampling rate. That is to say, with the control of a firmware, the sampling value is obtained by counting the numbers of 'Busy' of buffer status message during a continual sampling of 2.56 seconds. In other words, the firmware will control the spindle motor of the optical drive to increase the rotating speed if the sampling value corresponding to the buffer status message 'Busy' obtained from the continual sampling of 2.56 seconds is over a critical value, while the firmware will control the spindle motor of the optical drive to remain the same rotating speed if the sampling value corresponding to the buffer status message 'Busy' obtained from the continual sampling of 2.56 seconds is below the critical value.

The above disclosed decision process is a determination method when the addresses of these reading requests issued by a host are continuous. The data stored in the buffer of the optical drive are data read from the continuous addresses on the optical disk. In other words, when the addresses of these reading requests issued by the host are continuous, the buffer will immediately provide data to the host.

However, when the addresses of these reading requests issued by the host are not continuous, the data originally stored in the buffer will be completely deleted due to the design of the buffer. So the determination method illustrated in FIG. 1 cannot be applied when the data addresses of these reading requests issued by the host are discontinuous.

When the host issues reading requests of continuous addresses in a high frequency, the interval between any two requests is about 50 ms according to observation. In other words, when the buffer status message is 'Busy', the host is continually issuing reading requests of continuous addresses in a high frequency with the interval between any two requests approximating 50 ms.

Figure 2:
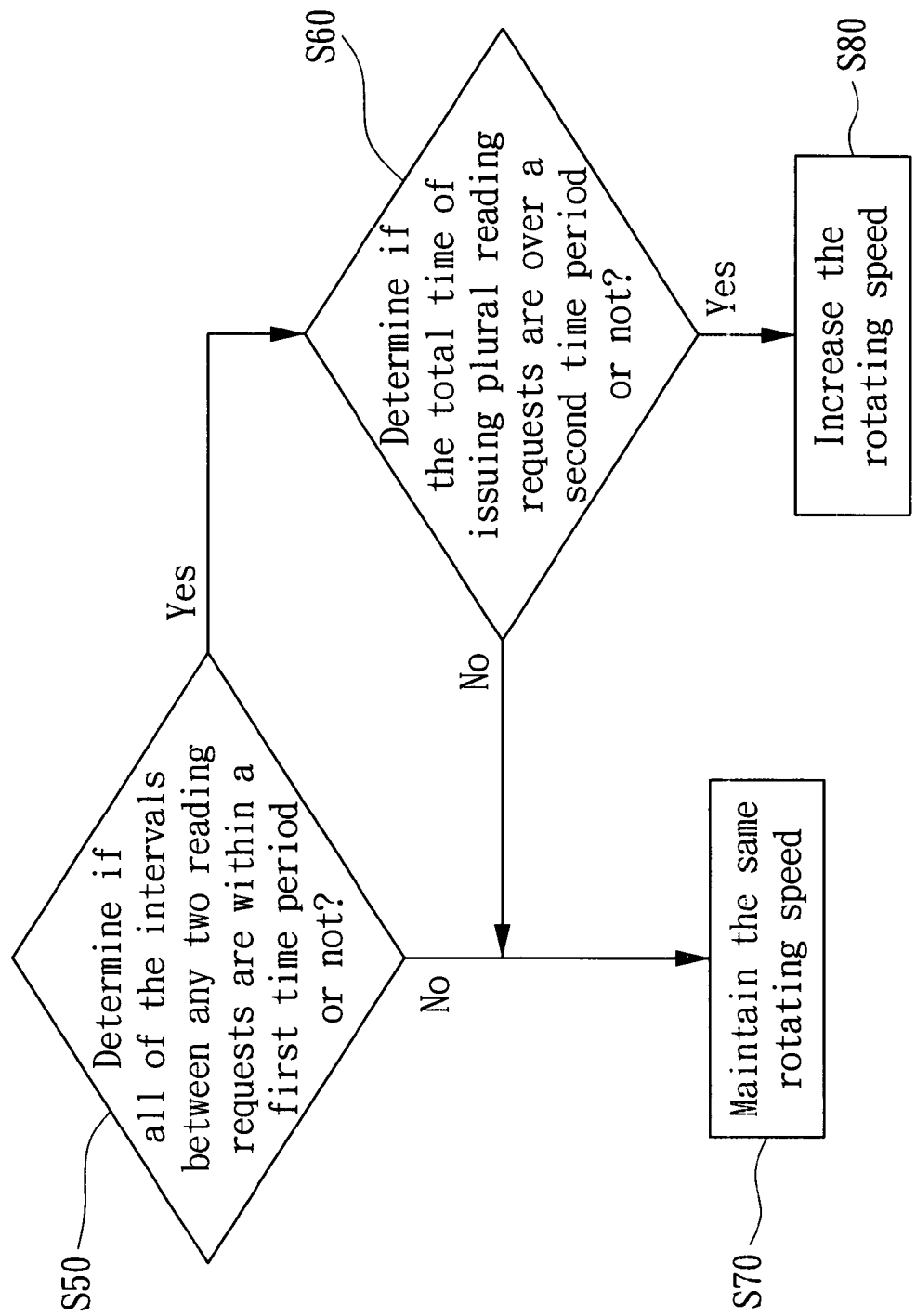
FIG. 2 is a flowchart of a method of controlling rotating speed of an optical drive when the addresses of the reading requests issued by a host are discontinuous.

Therefore, to determine the timing for increasing the rotating speed of the optical drive when the addresses of these reading requests are discontinuous is based on the frequency of the occurrences of all reading requests and the duration time thereof. Referring to FIG. 2, a flowchart of a method of controlling rotating speed of an optical drive when the addresses of the reading requests issued by a host are discontinuous is illustrated.

Step S50: Determine if all of the intervals between any two reading requests are within a first time period or not;

Step S60: Determine if the total time of issuing reading requests is over a second time period or not;

Step S70: Maintain the same rotating speed; and

Step S80: Increase the rotating speed.

First of all, a first time period is determined. It is assured that these reading requests are issued in a high frequency, if all the intervals between any two reading requests are within the first time period. According to the present preferred embodiment, it can be assured that these reading requests are issued in a high frequency, if all the intervals between any two reading requests are within 100 ms, while these reading requests are issued in a low frequency and thus the rotating speed of the spindle motor will be maintained, if at least one interval between any two reading requests is beyond 100 ms.

Next, a second time period is determined. Calculate and determine whether the total duration time of these reading requests are larger than the second time period, if all the intervals between any two reading requests are within 100 ms. According to the present preferred embodiment, when the host issues reading requests in a high frequency, increase the rotation speed of the spindle motor of the optical drive if the total duration time of issuing reading requests by the host is larger than 2.56 seconds. To the contrary, when the host issues reading requests in a high frequency, maintain the same rotating speed of the spindle motor of the optical drive if the total duration time of issuing plural reading requests by the host is not larger than 2.56 seconds.

According to the invention, no matter the host issues reading requests of continuous addresses or issues reading requests of discontinuous addresses, the optical drive will increase the rotating speed of the spindle motor provided that these reading requests are issued in a high frequency with each interval between any two reading requests being less than a first time period and that these reading requests are continually issued with the total duration time being larger than a second time period.

The advantage of the method of controlling rotating speed of an optical drive according to the invention is that the invention may determine the frequency of issuing reading requests and control the spindle motor to increase the rotating speed at appropriate timing no matter addresses of these reading requests issued by the host are continuous or discontinuous.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of controlling rotating speed of an optical drive, comprising steps of:
    receiving a plurality of reading requests issued by a host; and
    increasing the rotating speed of a spindle motor if the time interval between any two reading requests is less than a first time period and the total duration time of issuing these reading requests by the host is more than a second time period.

2. The method of controlling rotating speed of an optical drive according to claim 1, wherein the first time period is 100 ms.

3. The method of controlling rotating speed of an optical drive according to claim 1, wherein the second time period is 2.56 seconds.

4. The method of controlling rotating speed of an optical drive according to claim 1, wherein the host is a personal computer.

5. The method of controlling rotating speed of an optical drive according to claim 1, wherein the data addresses of these reading requests are discontinuous.

* * * * *